(12) United States Patent
Caldas et al.

(10) Patent No.: US 10,478,969 B2
(45) Date of Patent: Nov. 19, 2019

(54) METHOD FOR THE IMPROVED DETECTION OF THE COLLISION OF A ROBOT WITH ITS ENVIRONMENT, SYSTEM AND COMPUTER PROGRAM PRODUCT IMPLEMENTING SAID METHOD

(71) Applicant: COMMISSARIAT A L'ENERGIE ATOMIQUE ET AUX ENERGIES ALTERNATIVES, Paris (FR)

(72) Inventors: Alex Caldas, Gif-sur-Yvette (FR); Maria Makarov, Gif-sur-Yvette (FR); Mathieu Grossard, Gif-sur-Yvette (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 470 days.

(21) Appl. No.: 14/766,568

(22) PCT Filed: Feb. 7, 2014

(86) PCT No.: PCT/EP2014/052394
§ 371 (c)(1),
(2) Date: Aug. 7, 2015

(87) PCT Pub. No.: WO2014/124869
PCT Pub. Date: Aug. 21, 2014

(65) Prior Publication Data
US 2016/0001446 A1  Jan. 7, 2016

(30) Foreign Application Priority Data

Feb. 14, 2013 (FR) .................................. 13 51268

(51) Int. Cl.
*B25J 9/16* (2006.01)
*B25J 9/06* (2006.01)
*G01P 15/00* (2006.01)

(52) U.S. Cl.
CPC .............. *B25J 9/1674* (2013.01); *B25J 9/06* (2013.01); *B25J 9/1605* (2013.01); *B25J 9/1676* (2013.01);
(Continued)

(58) Field of Classification Search
CPC ....................................................... B25J 9/1666
See application file for complete search history.

(56) References Cited

U.S. PATENT DOCUMENTS 5,119,006 A *  6/1992  Torii ...................... B25J 9/1676
                                                      318/568.1
2007/0244609 A1* 10/2007  Kinoshita .......... G05B 19/4062
                                                      701/22
(Continued)

OTHER PUBLICATIONS

V. Venkatasubramanian et al., "A Review of Process Fault Detection and Diagnosis: Part I: Quantitative Model-Based Methods," Computers Chemical Engineering 27, pp. 293-311, 2003.
(Continued)

*Primary Examiner* — Hyun D Park
(74) *Attorney, Agent, or Firm* — Baker & Hostetler LLP

(57) ABSTRACT

A method of detecting collision between a robot and its environment comprises: generating, on the basis of a dynamic model of the robot, a signal representative of the collisions between the robot and environment, the signal being a residual r; carrying out an adaptive high-pass filtering of the residual r; determining, in a recursive manner, an adaptive threshold T composed of at least one first dynamic term $T_{A1}$ equal to an item of information regarding the parametric uncertainties between the model and real behavior of the robot, the parametric uncertainties being related to a first variable characteristic of the state of the robot among the following variables: position, velocity or acceleration of an articulation of the robot, or a linear or nonlinear function of one of these variables or of a combi- (Continued)

nation; comparing the filtered residual with the adaptive threshold T to deduce the existence or otherwise of a collision.

16 Claims, 3 Drawing Sheets

(52) U.S. Cl.
CPC .. *G01P 15/001* (2013.01); *G05B 2219/40201* (2013.01); *Y10S 901/09* (2013.01); *Y10S 901/46* (2013.01)

(56) References Cited

U.S. PATENT DOCUMENTS

| | | | |
|---|---|---|---|
| 2008/0243383 A1* | 10/2008 | Lin | G01C 21/165 701/469 |
| 2010/0241293 A1 | 9/2010 | Ganguli et al. | |
| 2013/0073084 A1* | 3/2013 | Ooga | B25J 9/1633 700/254 |

OTHER PUBLICATIONS

P. Frank et al., "Survey of Robust Residual Generation and Evaluation Methods in Observer-Based Fault Detection Systems," Journal of Process Control, vol. 7, No. 6, pp. 403-424, 1997.

H. Schneider et al., "Observer-based Supervision and Fault Detection in Robots Using Nonlinear and Fuzzy Logic Residual Evaluation," IEEE Transactions on Control Systems Technology, vol. 4, No. 3, pp. 274-282, 1996.

A. De Luca et al., "Actuator Failure Detection and Isolation Using Generalized Momenta," Proceedings of the 2003 IEEE International Conference on Robotics & Automation, vol. 1, 2003, pp. 634-639.

S. Haddadin et al., "Collision Detection and Reaction: A Contribution to Safe Physical Human-Robot Interaction," IEEE International Conference on Intelligent Robots and Systems, 2008, pp. 3356-3363.

W. Dixon et al., "Fault Detection for Robot Manipulations with Parametic Uncertainty: a Prediction-Error-Based Approach," IEEE Transactions on Robotics and Automation, vol. 16, No. 6, Dec. 2000, pp. 689-699.

A. De Luca et al., "An Adapt-and-Detect Actuator FDI Scheme for Robot Manipulators," Proceedings of the 2004 IEEE International Conference on Robotics and Automation, vol. 5, 2004, pp. 4975-4980.

V. Sotoudehnejad et al., "Counteracting Modeling Errors for Sensitive Observer-Based Manipulator Collision Detection," 2012 IEEE International Conference on Intelligent Robots and Systems, pp. 4315-4320.

* cited by examiner

METHOD FOR THE IMPROVED DETECTION OF THE COLLISION OF A ROBOT WITH ITS ENVIRONMENT, SYSTEM AND COMPUTER PROGRAM PRODUCT IMPLEMENTING SAID METHOD

CROSS-REFERENCE TO RELATED APPLICATIONS

This application is a National Stage of International patent application PCT/EP2014/052394, filed on Feb. 7, 2014, which claims priority to foreign French patent application No. FR 1351268, filed on Feb. 14, 2013, the disclosures of which are incorporated by reference in their entirety.

FIELD OF THE INVENTION

The invention relates to the field of robots and associated command systems. More precisely, the subject of the invention is a method for detecting the collisions of a robot with its environment.

The invention applies advantageously to any type of manipulator robot, in particular serial manipulator robots but also manipulator robots with tree-like structure or with closed kinematic structure.

BACKGROUND

In recent years, numerous architectures of lightweight robots have been proposed. The avowed aim of this new generation of robot is to interact with human operators while carrying out a task. The robot and the operator therefore share the same work space, and this implies new problematic issues pertaining to the safety of the operator. Indeed, movements of the robot with large dynamic range can notably limit the access zone near the robot.

A general problematic issue relating to manipulator robots pertains to the detection of collisions between the robot and its environment. Indeed, with the aim of improving the operating security of the robot, it is important to be able to rapidly detect collisions between the robot and its environment so as to minimize the possible damage by applying suitable post-impact strategies.

Known collision detection algorithms are usually based on the comparison of measurements with a model, making it possible to create a signal called a "residual" and which constitutes an image of the collision. The mathematical modeling of the system never being perfectly representative of the real behavior of the robot, the residual is marred by errors, and the detection strategies must impose the use of safety margins (manifested in practice by thresholds) in order to be robust in relation to these errors. This avoids the occurrence of false alerts. But on account of these conservative margins, the robot loses its sensitivity to collisions.

SUMMARY OF THE INVENTION

The present invention is thus aimed at improving the collision detection schemes based on the generation and the evaluation of a residual while removing or limiting the impact of system modeling errors.

As will be developed subsequently, the schemes for detecting collision between a robot and its environment are generally designed according to a two-step approach: a first step of generating the residual, a term which contains the item of information associated with the collision phenomenon, and a second step of evaluating this residual which consists notably in taking a decision regarding the occurrence of a collision as a function of the value of the residual.

Concerning the first step of generating the residual, several approaches are inspired by the scientific field of automation. It is notably possible to cite document [1] which utilizes a Kalman estimating filter, whose estimated quantity is used as residual. Document [2] describes a more specific approach which arises from fault detection. Article [3] describes a diagnosis observation method used on a robot arm in order to generate the residual. In the field of robotics, the most widely used residual generating strategy consists in comparing a measurement of the articular torques $\tau$ with their estimation $\hat{\tau}$ deduced on the basis of the inverse dynamic model of the robot. This technique has been improved by using the equation for the generalized momentum of a robot in articles [4] and [5], thereby avoiding the on-line calculation of the acceleration and reducing the influence of the measurement noise. Another strategy described in [6], based on filtering the torque, makes it possible to avoid the calculation of the acceleration. All these schemes are based on a model of the robot, and this therefore implies sensitivity to modeling errors.

Concerning the second step of collision detection, the evaluation of the residual makes it possible to take into account the uncertainties of the model. It consists in verifying that the residual is below a certain threshold. If the residual exceeds this threshold, the algorithm detects collision. This threshold makes it possible to establish a margin so as to render the scheme insensitive to modeling errors and to avoid false alerts. The simplest technique, described for example in document [5], consists in comparing the residual with a constant or static threshold, which therefore represents the maximum modeling error. This scheme considerably reduces the sensitivity of the robot to a collision since a static threshold does not make it possible to discriminate the modeling error related variations of the residual.

More advanced strategies use dynamic thresholds, whose level is adapted on-line. It is possible to cite article [3] in which an adaptive threshold is generated with the aid of techniques based on fuzzy logic. This solution is fairly complex to put in place, since it requires data gathering in order to develop the fuzzy logic laws. In articles [6] and [7], several dynamic thresholds are proposed, taking into account the parametric uncertainties. These solutions are based solely on the inverse dynamic model of the robot which, even if the parameters of the model are estimated perfectly, does not constitute sufficient modeling. Indeed, it does not take into account certain physical phenomena specific to manipulator robots, in particular lightweight serial robots, such as the phenomena of flexibilities.

The invention proposes a method for detecting collisions which takes into account the errors in modeling the residual and makes it possible to solve the limitations of the known solutions set forth hereinabove. The modeling errors, which comprise at one and the same time uncertainties related to the parameters of the model of the robot and also the non-parametric uncertainties related to factors outside the chosen model, are identified and filtered in order to generate a filtered residual. A dynamic threshold is determined on-line so as to adapt the detection criterion to the uncertainties related to modeling errors.

The application of the method according to the invention makes it possible to preserve good sensitivity to collisions while decreasing the false alarm phenomena related to the modeling errors of the inverse dynamic model used to generate the residual.

The performance of the method according to the invention is notably improved for robots subject to large dynamic ranges in terms of velocity or acceleration.

The subject of the invention is a method of detecting collision between a robot composed of a plurality of bodies linked together by at least one articulation and its environment, said method comprising the following steps:

Generating, on the basis of a dynamic model of the robot, a signal representative of the collisions between the robot and its environment, said signal being called a residual r and comprising as many components as articulations of the robot, said method being characterized in that it furthermore comprises the following steps:

Carrying out an adaptive high-pass filtering of the residual r so as to render the residual independent of parametric or non-parametric uncertainties related to low-frequency phenomena, Determining in a recursive manner an adaptive threshold T composed of at least one first dynamic term $T_{A1}$ equal to an item of information regarding the parametric uncertainties between said model and the real behavior of the robot, said parametric uncertainties being related to a first variable $e_i$ characteristic of the state of said robot from among the following variables: the position, the velocity or the acceleration of an articulation of the robot, or a linear or nonlinear function of one of these variables or of a combination of these variables, Comparing the filtered residual with the adaptive threshold T so as to deduce therefrom the existence or otherwise of a collision.

According to a particular aspect of the invention, said adaptive threshold T is composed of the sum of several dynamic terms $T_{A1}$, $T_{A2}$, $T_{A3}$ each equal to an item of information regarding the parametric uncertainties between said model and the real behavior of the robot, said parametric uncertainties being related to a different variable, characteristic of the state of said robot from among the following variables: the position, the velocity or the acceleration of a fixed point of the robot, or a linear or nonlinear function of one of these variables or of a combination of these variables.

According to another particular aspect of the invention, said adaptive threshold T furthermore comprises a static term $T_{static}$ configured so as to be greater than a measurement noise level.

According to another particular aspect of the invention, the filtering step is carried out by means of a recursive least squares algorithm.

This filtering step can comprise the following sub-steps:

Estimating, in a recursive manner, the coefficients of the transfer function of the high-pass filter $G_0^{-1}$, Filtering the residual r with the estimated high-pass filter.

According to another particular aspect of the invention, an additional step of temporal filtering is applied to the filtered residual for each of its components. The additional step of temporal filtering can be a step of root mean square calculation.

According to another particular aspect of the invention, the step of determining at least one first dynamic term $T_{A1}$, $T_{A2}$, $T_{A3}$ of the adaptive threshold T is carried out by means of a recursive least squares algorithm.

The step of determining at least one first dynamic term $T_{A1}$, $T_{A2}$, $T_{A3}$ of the adaptive threshold T can comprise the following sub-steps:

Estimating, in a recursive manner, the coefficients of the transfer function $\Delta_i$ modeling the parametric uncertainties related to said first variable $e_i$ characteristic of the state of said robot, Filtering said first variable $e_i$ characteristic of the state of said robot with a filter of transfer function $\Delta_i$ estimated in the previous step so as to obtain a dynamic term $T_{A1}$, $T_{A2}$, $T_{A3}$ of the adaptive threshold T.

According to another particular aspect of the invention, an additional step of temporal filtering is applied to said dynamic term $T_{A1}$, $T_{A2}$, $T_{A3}$ of the adaptive threshold T for each of its components.

The additional step of temporal filtering can be a step of root mean square calculation.

According to another particular aspect of the invention, the step of comparing the filtered residual with the adaptive threshold T so as to deduce therefrom the existence or otherwise of a collision comprises the following sub-steps:

Comparing, for each articular component, the filtered residual with the adaptive threshold T, Concluding the existence of a collision if, for at least K components, the filtered residual is greater than the adaptive threshold T, K being a strictly positive predetermined integer less than or equal to the number of articulations of the robot.

According to another particular aspect of the invention, the step of generating the residual consists of the following sub-steps:

Determining, on the basis of an item of information regarding the state of the robot and by way of a dynamic model, an estimation of the articular torques of the robot, Performing a measurement of the state of the robot, for example a measurement of the articular torques, Calculating the residual as the difference between the estimation and the measurement of the state of the robot.

According to another particular aspect of the invention, the parametric uncertainties related to the articular acceleration of the robot are uncertainties regarding the inertia matrix of the robot.

According to another particular aspect of the invention, the parametric uncertainties related to the articular velocity of the robot are uncertainties regarding the matrix of the centrifugal and Coriolis terms of the robot and/or regarding the viscous frictions.

According to another particular aspect of the invention, a nonlinear function is the sign function or the exponential function or the absolute value function.

According to another particular aspect of the invention, the parametric uncertainties related to the sign of the articular velocity of the robot are uncertainties regarding the dry frictions.

The subject of the invention is also a computer program comprising instructions for the execution of the method of detecting collision according to the invention, when the program is executed by a processor.

The subject of the invention is also a recording medium readable by a processor on which is recorded a program comprising instructions for the execution of the method of detecting collision according to the invention, when the program is executed by a processor.

The subject of the invention is also a command system for a robot comprising a control member for the manipulation of the robot, an interface for the exchange of information regarding the state of the robot and a module for detecting collisions which is adapted for implementing the method according to the invention.

BRIEF DESCRIPTION OF THE DRAWINGS

Other characteristics and advantages of the present invention will become more apparent on reading the description which follows in relation to the appended drawings in which.

DETAILED DESCRIPTION

Figure 1:
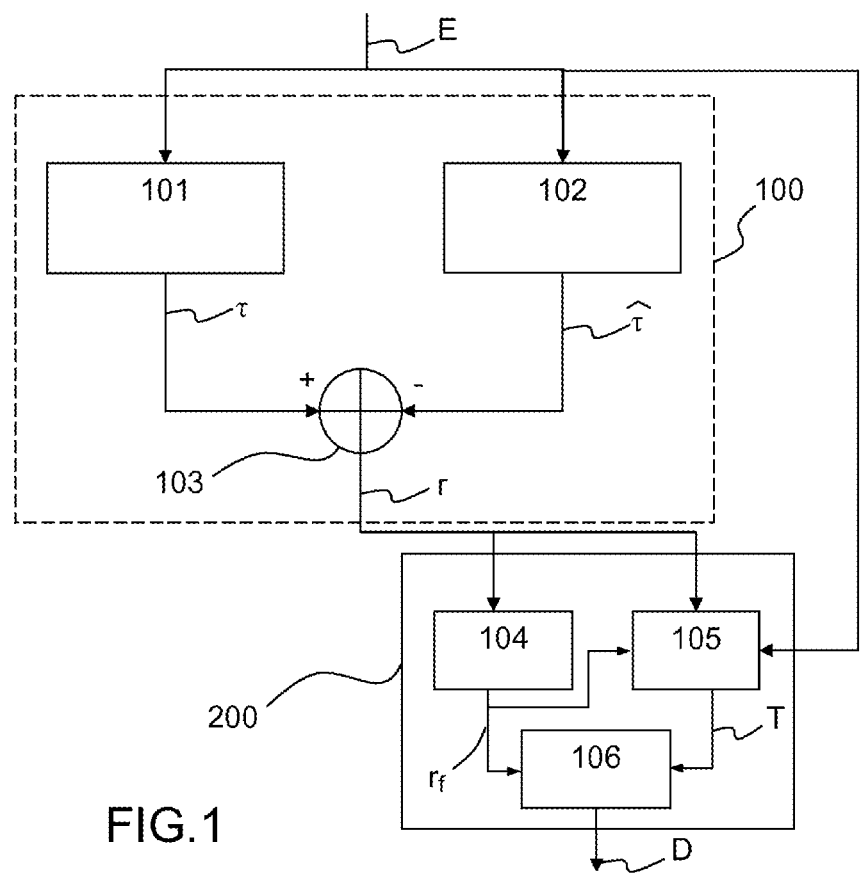
FIG. 1 represents a flowchart illustrating the implementation steps of the method according to the invention.

FIG. 1 represents, on a flowchart, the various implementation steps of the method for detecting collisions according to the invention.

The method according to the invention receives as input, an item of information E regarding the state of the robot, at any instant or over a given time interval. The item of information E regarding the state of the robot consists of state variables of the robot. These variables can for example take the form of the triplet $\{q, \dot{q}, \ddot{q}\}$ comprising the position $q$, the velocity $\dot{q}$ and the acceleration $\ddot{q}$ for each articulation of the robot. As will be explained in greater detail subsequently, the item of information E regarding the state of the robot can also consist of a single of the three aforementioned state variables or of two of these variables or else of any linear or nonlinear function of one or more of these three variables. In particular but not solely, the possible nonlinear functions are the sign function, the exponential function, the absolute value function or any combination of one or more of these functions. Furthermore the item of information E regarding the state of the robot also comprises a measurement $\tau$ of the articular torques of the robot or an item of information making it possible to deduce this measurement, for example a measurement of the motor current on each articulation of the robot.

A first part 100 of the method according to the invention consists in generating a residual r which contains the item of information regarding the events associated with a collision of the robot with its environment.

This first part 100 comprises a first step 101 of measurement $\tau$ of the articular torques of the robot, that is to say of the torques measured at the level of each articulation of the robot. As explained hereinabove, this step may, for example, be carried out on the basis of measurements of the motor currents on each articulation.

The first part 100 of the method also comprises a second step 102 of determining a model of the behavior of the robot leading to an estimation $\hat{\tau}$ of the articular torques of the robot.

Various models are possible and known to the person skilled in the art. A particular example of a dynamic model of a rigid serial robot is defined by the following relations:

$$\tau = \hat{A}(q)\ddot{q} + \hat{H}(q,\dot{q}) + \tau_c \quad (1)$$

with:

$$\hat{H}(q,\dot{q}) = \hat{C}(q,\dot{q})\dot{q} + \hat{Q}(q) + \hat{\tau}_f \quad (2)$$

$q, \dot{q}, \ddot{q}$ are the vectors of the respective estimations or measurements of the articular positions, velocities and accelerations.

$\hat{\tau}$ is a vector of estimates of the articular torques.

$\tau_c$ is a vector of collision torques. The forces applied to the robot's terminal tool can be reflected at the motor level for example by way of the relation:

$$\tau_c = J(q)^T F_c$$

where $F_c$ is the wrench of the exterior forces applied to the robot and $J(q)$ is the Jacobian matrix of the robot.

$\hat{A}(q)$ is an estimate of the inertia matrix of the robot.

$\hat{C}(q, \dot{q})$ is an estimate of the matrix of the centrifugal and Coriolis terms.

$\hat{Q}(q)$ is a vector of the estimates of the gravity torques.

$\hat{\tau}_f$ is a vector of the estimates of the friction torques. The frictions may, for example, be modeled by a Coulomb model according to the following relation:

$$\tau_f = F_v \dot{q} + F_s \text{sign}(\dot{q}) \quad (2')$$

where $F_v$ is the coefficient of viscous frictions and $F_s$ the coefficient of dry frictions and sign( ) designates the sign function. The term $F_v \dot{q}$ represents an estimate of the viscous frictions. The term $F_s \text{sign}(\dot{q})$ represents an estimate of the dry frictions.

The unknown in equation (1) is the vector of collision torques, step 102 of the method according to the invention therefore consists in estimating the vector of articular torques according to relation (3):

$$\hat{\tau} = \hat{A}(q)\ddot{q} + \hat{H}(q,\dot{q}) \quad (3)$$

The dynamic model of the robot exhibited hereinabove is given by way of illustrative example but ought not be interpreted as limiting of the scope of the invention. Indeed, other models may be used, for example, a model similar to that of equation (1) in which one of the two terms $A(q)\ddot{q}$ or $H(q, \dot{q})$ is ignored. Generally an estimate of an articular torque of the robot is composed of at least any one term from among the following terms: a term dependent on the articular acceleration, a term dependent on the articular velocity, a term dependent on the articular position, a term dependent on a linear or nonlinear function of any one of the above three terms or of a combination of these terms, for example the sign function, the exponential function or the absolute value function.

The first part 100 of the method according to the invention furthermore comprises a third step 103 of generating the residual r by calculating the difference between the articular torques measurement produced by the first step 101 and the articular torques estimate produced by the second step 102:
$r = \tau - \hat{\tau}$.

Any scheme known to the person skilled in the art, alternative to that described hereinabove for the first part 100 of the method according to the invention, may be used as replacement insofar as it makes it possible to obtain a residual, that is to say a signal representative of a collision between the robot and its environment. For example, document [5] describes a scheme for generating the residual based on the comparison of momenta rather than articular torques. This scheme can be used as replacement for the first part 100 of the method according to the invention.

On the basis of relations (1) and (3), the residual r can be expressed as the sum of the collision torques $\tau_c$ and of at least one term corresponding to the modeling errors in the models used to estimate the articular torques. The modeling errors comprise on the one hand parametric uncertainties and on the other hand non-parametric uncertainties.

The parametric uncertainties are the bounded errors that may affect the parameters of a model of known structure, for example a model represented by the aforementioned relations (1) and (2). These errors are due to the experimental identification or to the intrinsic variation of the parameters of the model as a function of the operating conditions, for example the variation of the payload, the temperature, the aging.

The non-parametric uncertainties encompass errors which are not related to the model itself but to other phenomena such as the flexibilities of the robot or the friction model used.

In the example given hereinabove where the estimation of the articular torques is obtained with the aid of relation (3), the residual r can be expressed with the aid of the following relations:

$$r = \tau - \hat{\tau} = \tau_c + \Delta A(q)\ddot{q} + \Delta H(q,\dot{q}) \quad (4)$$

With:

$$\Delta A(q) = A(q) - \hat{A}(q)$$

$$\Delta H(q,\dot{q}) = H(q,\dot{q}) - \hat{H}(q,\dot{q})$$

$\Delta A(q)$ et $\Delta H(q, \dot{q})$ are the errors between the real values and the estimated values of the terms employed to model the behavior of the robot, in the chosen example this entails the inertia matrix A of the robot and the vector H defined by relation (2).

These errors have a direct impact on the value of the residual which can no longer be considered to be strictly equal to the vector of collision torques (for each articulation). Consequently, even in the absence of collision, the value of the residual is not always zero, thereby posing the problem of the criterion to be applied in order to evaluate the residual and produce a decision regarding the occurrence of a detection.

An aim of the invention is to carry out a filtering of the residual and a formulation of a dynamic detection threshold which makes it possible to circumvent fluctuations related to the errors between the dynamic model of the robot and its real behavior. These processings are grouped together in a second part 200 of the method according to the invention which comprises a step 104 of filtering the residual r so as to obtain a filtered residual $r_f$, a step 105 of on-line formulation of a dynamic detection threshold T as a function of the residual r and of the state of the robot E and finally a step 106 of comparing the filtered residual $r_f$ with the detection threshold T in order to formulate a decision D on the presence or the absence of collisions.

Before describing the steps implemented in the second part 200 of the method according to the invention, the following modeling of the residual is introduced for a better understanding of the principle on which the invention is based. Accordingly, we consider the field of Z transforms. Relation (5) gives the modeling of the residual which serves as the basis for the invention.

$$r_m(z) = \tau_c(z) + \Sigma_{i=1}^{N} S_i(z)e_i(z) + G_0(z)b(z) \quad (5)$$

The vector of the model of the residual $r_m(z)$ is composed of three elements. The first component is the vector of collision torques $\tau_c(z)$ which is the signal that it is sought to detect. The second component $\Sigma_{i=1}^{N} S_i(z)e_i(z)$ corresponds to the modeling errors, in particular due to parametric uncertainties. The vectors $e_i(z)$ represent the information regarding the state of the robot, namely the state variables of the robot such as the acceleration, the velocity, the position or any linear or nonlinear function of one of these variables or of a combination of these variables. The function $S_i(z)$ is the transfer function of the modeling errors associated with the item of information $e_i(z)$.

Stated otherwise, in the example described hereinabove where the dynamic model of the robot complies with relation (1), it is seen that the parametric uncertainties are dependent on three distinct terms, the articular acceleration $\ddot{q}$, the articular velocity $\dot{q}$ and the sign of the articular velocity sign($\dot{q}$). The model arising from relation (5) may be then written, for this particular example:

$$r_m(z) = \tau_c(z) + S_1(z)e_1(z) + S_2(z)e_2(z) + S_3(z)e_3(z) + G_0(z)b(z) \quad (6)$$

The terms $e_1(z)$, $e_2(z)$, $e_3(z)$ correspond respectively to the Z transforms of the articular acceleration $\ddot{q}$, of the articular velocity $\dot{q}$ and of the sign of the articular velocity.

The transfer function $S_1(z)$ is aimed at modeling the modeling errors related to the acceleration terms in relation (4), namely the term $\Delta A(q)\ddot{q}$. This term is particularly significant when the robot is subject to trajectories with large dynamic ranges.

The transfer function $S_2(z)$ is aimed at modeling the parametric uncertainties related to the velocity terms in relation (4), stated otherwise the components of the term $\Delta H(q, \dot{q})$ which depend on the articular velocity. This term takes into account the velocity-dependent non-linearities, such as the phenomena related to the frictions as well as parametric uncertainties in the Coriolis and centrifugal vectors. With reference to relations (2) and (2'), it may be seen that the velocity dependent terms, in the expression for the dynamic model of the robot, are dependent on the estimates used for the matrix of the centrifugal and Coriolis terms C(q, $\dot{q}$) (relation (2)) and for the friction torques $\tau_f$ (relation (2')).

Finally the transfer function $S_3(z)$ is aimed at modeling the modeling errors related to the terms corresponding to the sign of the velocity in relation (4) thus making it possible to take account of the uncertainties in the dry frictions (see relation (2')).

The third component of the model of the residual $r_m(z)$, namely the term $G_0(z)b(z)$ represents a vector of filtered white noise $b(z)$, which makes it possible to take account of the measurement noise and unmodeled dynamic ranges such as the flexibilities which may be present in lightweight serial robots. Such flexibilities are characterized by resonant modes at low frequencies. In the model proposed, according to the invention, by relations (5) and (6), the white noise $b(z)$ impacting the residual is filtered by a low-pass filter $G_0(z)$. The term $G_0(z)b(z)$ equivalent to this filtering operation corresponds in fact to noise whose frequency spectrum is situated predominantly in the low-frequencies. Indeed, the measurement noise which impacts the model of dynamic evolution of the robot is generally related to low-frequency phenomena such as gravitational effects or low-frequency flexibilities. These errors enter the category of the above-mentioned non-parametric uncertainties. On the contrary, collision phenomena are generally manifested by frequencies covering a wide spectrum and the more the contact, during collision, is characterized by an interaction of large stiffness with the environment, the more the resulting signal comprises high-frequency components. An objective of the method according to the invention therefore consists in distinguishing the high-frequency components, characteristic of a collision, from the low-frequency components, characteristic of measurement noise.

Figure 2:
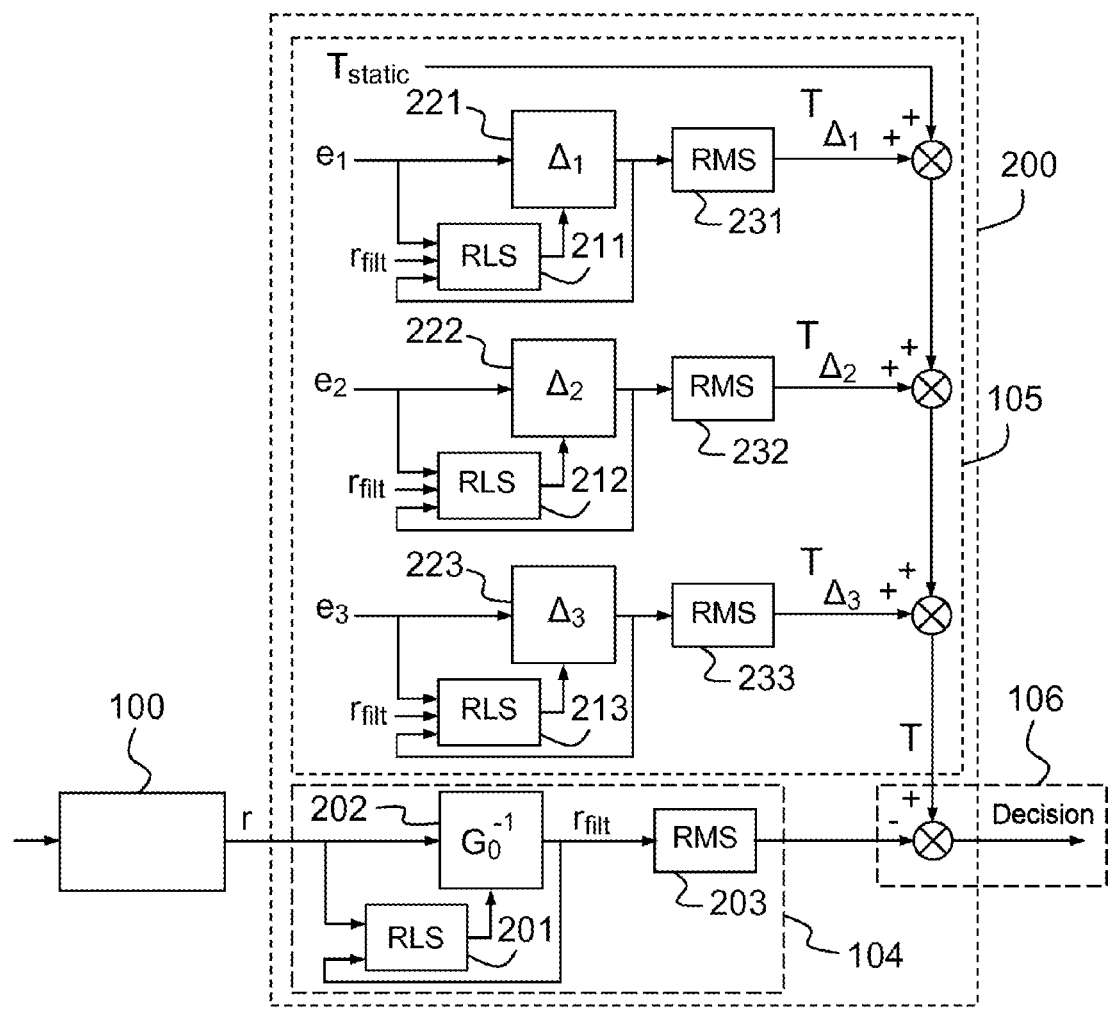
FIG. 2 represents a diagram representing in greater detail the step of evaluating the residual.

FIG. 2 represents, in greater detail, the processings implemented in the second part 200 of the method.

In the first step 104 of the second part 200 of the method, the residual r, obtained on completion of the first part 100 of the method, is filtered by a high-pass filter $G_0^{-1}(z)$ so as to render the residual independent of the non-parametric uncertainties related to the low-frequency phenomena, as explained hereinabove. The transfer function of the high-pass filter is, by way of illustration, represented by the term $G_0^{-1}(z)$ which is the inverse of the low-pass filter $G_0(z)$ used in the model of the residual according to relations (5) and (6). In practice the coefficients of the high-pass filter used are determined with the aid of an adaptive algorithm, based, for example, on the known recursive least squares (RLS) model. The function carried out by such an algorithm consists in calculating the coefficients of the envisaged transfer function, here the high-pass filter, by taking account of the past measurements and of the set of coefficients calculated at the previous instant.

The adaptive filtering of the residual is represented in FIG. 2 by the box 201 which corresponds to the learning of the coefficients of the filter and to the box 202 which corresponds to the filtering itself carried out on the residual r so as to produce at output a filtered residual $r_f$. The filtered residual obtained is a vector whose components are the respective filtered residuals corresponding to each articulation of the robot, it being understood that the robot comprises at least one articulation.

Optionally, a further filtering module 203 can be added. This module operates a temporal filtering of each component of the filtered residuals vector $r_f$ so as to eliminate the noise that may result from a numerical differentiation. The filtering module 203 may, for example, be embodied through a root mean square calculation. Alternatively, the filtering module 203 may be replaced by the absolute value function.

An exemplary embodiment of the adaptive filtering of the residual r by way of a recursive least squares (RLS) scheme is now described in greater detail.

The well known equations for implementing the RLS algorithm are firstly recalled.

Let $\theta_k$ be the vector of parameters to be estimated, in the present case this entails the vector of coefficients of the filter $G_0^{-1}$ which is learnt in real time. A parameter of the RLS algorithm is the order of the numerators and of the denominators of the transfer function to be estimated, here $G_0^{-1}(z)$. The larger the order of the transfer function, the larger its descriptive power and the better the accuracy of representation of the results. On the other hand, this occurs to the detriment of the calculation time which can become prohibitive. The choice of the order is therefore a compromise between accuracy of the model and calculation time.

Let $\Phi_k$ be the vector of input measurements, in the present case this entails the past successive measurements of the residual r.

The equations of the RLS algorithm can be written in the following manner:

$$F_k = \frac{1}{\lambda}\left(F_{k-1} + \frac{F_{k-1}\phi_{k-1}\phi_{k-1}^T F_{k-1}}{\lambda + \phi_{k-1}^T F_{k-1}\phi_{k-1}}\right) \quad (7)$$

$$\varepsilon_k = y_k - \theta_{k-1}\phi_{k-1} \quad (8)$$

$$\theta_k = \theta_{k-1} + F_k \phi_{k-1} \varepsilon_k \quad (9)$$

$F_k$ is the covariance matrix of the input quantity of the algorithm (here the residual r). $\lambda$ is the forgetting factor parameter.

$Y_k$ is the input quantity of the algorithm, equal to the residual $r_k$ in the present case.

$\varepsilon_k$ is the prediction error which corresponds to the criterion to be minimized. In the present case, it is sought to minimize the difference between the residual's current value $r_k$, produced as input of the algorithm, and the result of the filtering, by the transfer function with the estimated coefficients $\theta_{k-1}$, of the past values of the residual. The index k represents the index of the current value of a quantity, the indices k-i represent the indices of the past values of a quantity.

Accordingly, we put $$y_k = r_k$$

$$\Phi_k = [r_{k-1} \ldots r_{k-n_{G0}}]^T$$

The filtered residual is calculated with the aid of the following relation:

$r_{filt} = r_k - \theta_{G0}^T \Phi_k$, where $\theta_{G0}^T$ designates the transposed vector of estimated coefficients of the transfer function of the filter $G_0^{-1}$ and $\Phi_k$ the vector of past values of the residual $r_k$.

Equations (7),(8),(9) hereinabove are given by way of illustration to explain a possible implementation of the estimation of the coefficients of the filter $G_0^{-1}$. These equations must not be interpreted as limiting, it being understood that the person skilled in the art knows how to implement any other adaptive algorithm or any variant of implementation of the adaptive RLS algorithm so as to arrive at the same result envisaged by the present invention.

In the second step 105 of the second part 200 of the method, a dynamic collision detection threshold T is determined on-line, that is to say in tandem with the displacement of the robot.

The dynamic threshold T is calculated so as to take into account the various modeling errors, such as described hereinabove, affecting the dynamic model of the robot, in particular the parametric and non-parametric uncertainties.

In the example of FIG. 2, the model used is of the type of that of relation (1), stated otherwise it consists essentially of components dependent on the articular acceleration (represented by the quantity $e_1(z)$), on the articular velocity (represented by the quantity $e_2(z)$) and on the sign of the articular velocity (represented by the quantity $e_3(z)$).

Returning to relation (6) and multiplying both sides by the transfer function of the high-pass filter $G_0^{-1}(z)$, a model of the filtered residual is obtained:

$$r_f(z) = G_0^{-1}(z)\tau_c(z) + \Delta_1(z)e_1(z) + \Delta_2(z)e_2(z) + \Delta_3(z)e_3(z) + b(z) \quad (7)$$

With $\Delta_i(z) = G_0^{-1}(z)S_i(z)$

According to the model of relation (7), the filtered residual is therefore composed of three elements:
the filtered collision torques vector, which represents the signal to be detected;
the modeling errors dependent on the signals $e_i(z)$ of the system;
a vector of white noise.

An objective of the second step 105 of the second part 200 of the method according to the invention consists in estimating on-line the transfer functions $\Delta_i(z)$, for each input variable $e_i(z)$, and in filtering this variable by a filter reproducing this transfer function. The coefficients of the transfer function $\Delta_i(z)$ are estimated in a recursive manner so as to produce non-stationary coefficients.

Accordingly, a possible scheme consists in using, just as for the filtering of the residual, an adaptive algorithm of the recursive least squares (RLS) type. Any other scheme of the state of the art allowing a recursive estimation of the coefficients is conceivable, in particular a heuristic algorithm, a genetic algorithm, a particle filter, a gradient scheme or any equivalent optimization scheme.

Returning to equations (7),(8) and (9) given hereinabove, we apply in the same manner as for the filtering of the residual, the RLS algorithm with the following parameters for each of the input variables $e_i(z)$.

The input quantity of the algorithm $Y_k$ is equal to the filtered residual $r_{fk}$.

$\theta_k$ is the vector of coefficients of the transfer function $\Delta_i(z)$ to be estimated.

$\Phi_y$ is a matrix which contains, for each articulation of the robot, a vector of the current component and of the past components (over a given horizon dependent on the chosen order of the transfer function) of the input variable $e_i(z)$, for example the articular acceleration or the articular velocity. $\Phi_k$ also contains the past values of the dynamic threshold $T_{Ai}$. The prediction error $\varepsilon_k$ that it is sought to minimize is the error between the current value of the filtered residual and the result of the filtering of the input variable $e_i$ by the estimate of the transfer function $\Delta_i(z)$.

The current value of the dynamic threshold $T_{Ai}(k)$ is calculated with the aid of the following relation $T_{Ai}(k)= \theta^T_k \Phi_k$, with $\theta_k$ being the estimate, calculated with the aid of relation (9), of the coefficients of the filter $\Delta_i(z)$.

The adaptive algorithm is therefore applied for each input variable $e_i(z)$ and consists as explained hereinabove of a first part 211,212,213 which corresponds to the learning of the coefficients of the transfer function of the filter $\Delta_i(z)$ and in a second part 221,222,223 which corresponds to the filtering itself carried out on the input variable $e_i(z)$ so as to obtain a component $T_{Ai}$ of the dynamic threshold.

On output from the adaptive algorithm, the component $T_{Ai}$ is a vector quantity which contains the components associated with the various articulations of the robot.

As already explained hereinabove, optionally, an additional temporal filtering module 231,232,233 can be added to eliminate residual noise in the components $T_{Ai}$. These filtering modules 231,232,233 may, for example, be embodied through a root mean square calculation. Alternatively, they can be replaced by the absolute value function.

Ultimately, the global dynamic threshold T is obtained by summing the components $T_{Ai}$ obtained for each input variable $e_i(z)$ and by adding a static component $T_{static}$ whose value is adjusted as a function of the noise level.

In the example of FIG. 2 which pertains to three input variables, the global dynamic threshold obtained by applying the invention is given by the following relation:

$$T = T_{static} + T_{A1} + T_{A2} + T_{A3}$$

The last step 106 of the method according to the invention consists in comparing the filtered residual $r_f$ output by step 104 with the global dynamic threshold T and deducing therefrom the existence of a collision if the filtered residual exceeds said threshold. This comparison may be performed for each component of the threshold T corresponding to each articulation of the robot. A collision may be detected if the filtered residual exceeds the dynamic threshold T for at least one articulation. Other variant embodiments of the final detection step 106 are possible such as the triggering of a detection alert only if a predetermined number K among the N articulations of the robot considered satisfies the criterion of comparison between the filtered residual and the dynamic threshold T. Any other variant embodiment making it possible to formulate a decision regarding the occurrence of a collision as a function of the comparison of the vector of filtered residuals and of the vector of dynamic thresholds T is conceivable and will be understood by the person skilled in the art as forming a fully fledged part of the invention.

Figure 3:
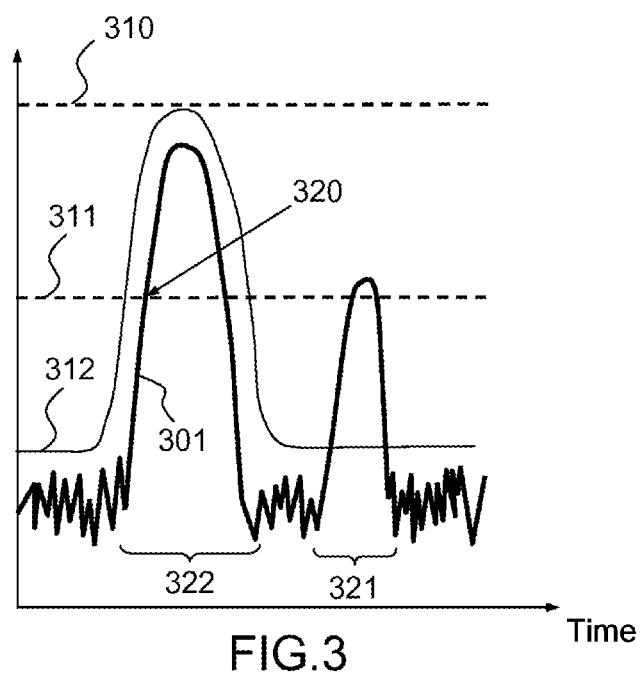
FIG. 3 represents a chart illustrating the improvement in the reliability of the collision detection decision by application of the method according to the invention.

FIG. 3 illustrates, on a chart representing the evolution of the filtered residual $r_f$ obtained by applying the method according to the invention as a function of time, the contribution of the invention with respect to the prior art solutions.

In FIG. 3 the evolution 301 of the filtered residual as a function of time is represented. During a first time period 320, the filtered residual undergoes a first amplitude variation related to the modeling errors in the dynamic model of the robot. During a second time period 321, the filtered residual undergoes a second amplitude variation related to a collision with an object. In the case of the prior art solutions which use a static detection threshold, we remark that it is never possible, with one and the same threshold, to detect collision while at the same time avoiding triggering an alarm in respect of phenomena related to modeling errors. If the threshold 310 is too high, it does not make it possible to detect the collision 321, if the threshold 311 is too low, it engenders a false detection regarding the event 320 related to modeling errors.

In FIG. 3 the dynamic threshold 312 is also represented which is obtained by applying the method according to the invention and which makes it possible to correctly detect the collision phenomenon 321 while at the same time avoiding a false detection regarding the first event 320, the source of variation of amplitude of the residual.

Figure 4:
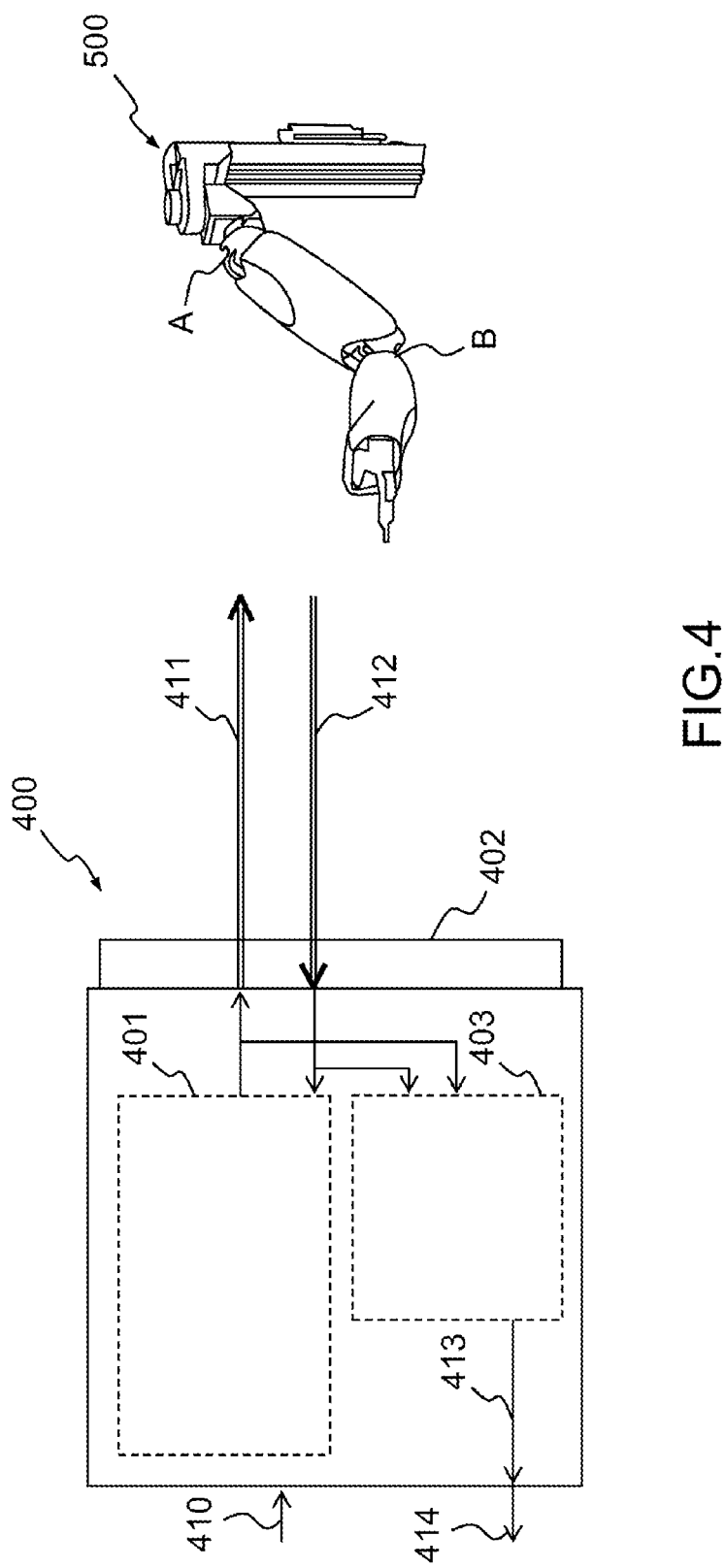
FIG. 4 represents a diagram of a command system for a manipulator robot according to the invention.

FIG. 4 represents a diagram of a command system 400 according to the invention for a manipulator robot 500 comprising one or more articulations A,B.

The system 400 according to the invention comprises a control member 401 for controlling the trajectory of the arm of the manipulator robot 500, an input/output physical interface 402 between the system 400 and the robot 500 and a module 403 for detecting collisions.

The control member 401 receives as input a high-level control command 410 to drive the robot 500 and transmits as output 411, via the interface 402, information to the robot 500 so as to manipulate it, for example a reference torque. In return, a measurement 412 of the articular torques and positions of the robot 500 is provided to the system 400. This measurement 412 can be taken directly equal to the reference torque 411. Indeed, in the case of DC motors, a reference torque is dispatched to the power amplifiers driving the motors of the robot and slaved in terms of current by an internal feedback loop independent of the main controller. This slaving in terms of current being very fast on the scale of the dynamics of the robot and of the main sampling time, it is in general possible to assume that the torque actually applied to the robot is equal to the reference torque. By virtue of this assumption it is therefore possible to use the reference torque directly as input to the detection algorithm, without needing to explicitly measure the articular torque. Alternatively, if the reference torque 411 is not available, for example because the control member 401 and the module for detecting collisions 403 are implemented in two distinct items of equipment, a measurement 412 of the articular torques of the robot is necessary.

The module for detecting collisions 403 receives the measurement 412 of the articular torques of the robot and establishes a decision 413 regarding the presence or the absence of collision. This decision 413 is for example a binary decision which is thereafter provided to an interface 414 so as to be utilized.

The module for detecting the collisions 403 can be implemented on the basis of hardware and/or software elements. It can notably be implemented in the guise of a computer program comprising instructions for its execution. The computer program can be recorded on a recording medium readable by a processor.

REFERENCES

[1] V. Venkatasubramanian, R. Rengaswamy, K. Yin, and S. N. Kavuri, "A review of process fault detection and diagnosis: Part i: Quantitative model-based methods," Computers Chemical Engineering, pp. 293-311, 2003.
[2] P. Frank and X. Ding, "Survey of robust residual generation and evaluation methods in observer-based fault detection systems," Journal of process control, vol. 7, no. 6, pp. 403-424, 1997.
[3] H. Sneider and P. Frank, "Observer-based supervision and fault detection in robots using nonlinear and fuzzy logic residual evaluation," Control Systems Technology, IEEE Transactions on, vol. 4, no. 3, pp. 274-282, 1996.
[4] A. De Luca and R. Mattone, "Actuator failure detection and isolation using generalized momenta," in Robotics and Automation, 2003. Proceedings. ICRA'03. IEEE International Conference on, vol. 1. IEEE, 2003, pp. 634-639.
[5] S. Haddadin, A. Albu-Schaffer, A. De Luca, and G. Hirzinger, "Collision detection and reaction: A contribution to safe physical humanrobot interaction," in Intelligent Robots and Systems, 2008. IROS 2008.IEEE/RSJ International Conference on. IEEE, 2008, pp. 3356-3363.
[6] W. Dixon, I. Walker, D. Dawson, and J. Hartranft, "Fault detection for robot manipulators with parametric uncertainty: a prediction-errorbased approach," Robotics and Automation, IEEE Transactions on, vol. 16, no. 6, pp. 689-699, 2000.
[71] A. De Luca and R. Mattone, "An adapt-and-detect actuator fdi scheme for robot manipulators," in Proceedings. ICRA'04. 2004 IEEE International Conference on, vol. 5. IEEE, 2004, pp. 4975-4980.

The invention claimed is:

1. A method for detecting a collision between a robot composed of a plurality of bodies linked together by at least one articulation and the environment of the robot, said method being executed by a system for detecting a collision comprising a processor, a control member, and a physical interface, the method comprising the steps of:
moving at least one articulation of the robot by manipulating, via a motor of the robot, a torque applied to the at least one articulation of the robot,
receiving, from a measurement device of the control member, at least a measure of a variable characteristic of the state of the robot among a position, a velocity or an acceleration of the at least one articulation of the robot,
executing, with the processor, a computer program stored on a non-transitory computer readable medium, the computer program stored on the non-transitory computer readable medium including instructions that when executed by the processor cause the processor to automatically perform the steps of:
generating, from a dynamic model of the robot, a signal representative of the collisions between the robot and the environment of the robot, said signal being called a residual r and comprising as many components as articulations of the robot,
adaptive high-pass filtering of the residual r so as to render the residual r independent of parametric or non-parametric uncertainties related to low-frequency phenomena,
determining recursively adaptive thresholds T composed of at least one first dynamic term $T_{A1}$ dependent on the parametric uncertainties between said model and the real behavior of the robot, said parametric uncertainties being related to a first variable $e_1$ characteristic of the state of said robot from among the following variables: the position, the velocity or the acceleration of the at least one articulation of the robot, or a linear or nonlinear function of one of these variables or of a combination of these variables, wherein determining recursively an adaptive threshold T of the adaptive thresholds T at a given instant is based upon a previously determined adaptive threshold of the adaptive thresholds T at an instant previous to the given instant, so that the adaptive threshold T is dependent on said parametric uncertainties between said model and the real behavior of the robot,
comparing the filtered residual with the adaptive threshold T so as to deduce therefrom the existence or otherwise of the collision,
deciding, as a result of the comparison of the filtered residual and the adaptive threshold T, if a collision between the robot and the environment of the robot occurs,
providing the decision to the interface, and
utilizing the decision provided to the interface, wherein the adaptive high-pass filtering is implemented via a recursive least squares algorithm and comprises:
estimating, in a recursive manner, the coefficients of the transfer function of the high-pass filter $G_0^{-1}$, and
filtering the residual r with the estimated high-pass filter.

2. The method of detecting collision as claimed in claim 1, wherein said adaptive threshold T is composed of the sum of several dynamic terms $T_{A1}$, $T_{A2}$, $T_{A3}$, each equal to an item of information regarding the parametric uncertainties between said model and the real behavior of the robot, said parametric uncertainties being related to a different variable, characteristic of the state of said robot from among the following variables: the position, the velocity or the acceleration of a fixed point of the robot, or a linear or nonlinear function of one of these variables or of a combination of these variables.

3. The method of detecting collision as claimed in claim 1, in which said adaptive threshold T furthermore comprises a static term $T_{static}$ configured so as to be greater than a measurement noise level.

4. The method of detecting collision as claimed in claim 1, in which an additional step of temporal filtering is applied to the filtered residual for each of the components.

5. The method of detecting collision as claimed in claim 4, in which the additional step of temporal filtering is a step of root mean square (RMS) calculation.

6. The method of detecting collision as claimed in claim 1, in which the step of determining at least one first dynamic term $T_{A1}$, $T_{A2}$, $T_{A3}$ of the adaptive threshold T is carried out by means of a recursive least squares algorithm.

7. The method of detecting collision as claimed in claim 6, in which an additional step of temporal filtering is applied to said dynamic term $T_{A1}$, $T_{A2}$, $T_{A3}$ of the adaptive threshold T for each of its components.

8. The method of detecting collision as claimed in claim 7, in which the additional step of temporal filtering is a step of root mean square calculation.

9. The method of detecting collision as claimed in claim 1, in which the step of determining at least one first dynamic term $T_{A1}$, $T_{A2}$, $T_{A3}$ of the adaptive threshold T comprises the following sub-steps:

estimating, in a recursive manner, the coefficients of the transfer function $\Delta_i$ modeling the parametric uncertainties related to said first variable $e_i$ characteristic of the state of said robot, and filtering said first variable $e_i$ characteristic of the state of said robot with a filter of transfer function $\Delta_i$ estimated in the previous step so as to obtain a dynamic term $T_{A1}$, $T_{A2}$, $T_{A3}$ of the adaptive threshold T.

10. The method of detecting collision as claimed in claim 1, in which step of comparing the filtered residual with the adaptive threshold T so as to deduce therefrom the existence or otherwise of a collision comprises the following sub-steps:

comparing, for each articular component, the filtered residual with the adaptive threshold T, and concluding the existence of a collision if, for at least K components, the filtered residual is greater than the adaptive threshold T, K being a strictly positive predetermined integer less than or equal to the number of articulations of the robot.

11. The method of detecting collision as claimed in claim 1, in which step of generating the residual consists of the following sub-steps:

determining, on the basis of an item of information regarding the state of the robot and by way of a dynamic model, an estimation of the articular torques of the robot, performing a measurement of the state of the robot, for example a measurement of the articular torques, and calculating the residual as the difference between the estimation and the measurement of the state of the robot.

12. The method of detecting collision as claimed in claim 1, in which the parametric uncertainties related to the articular acceleration of the robot are uncertainties regarding the inertia matrix of the robot.

13. The method of detecting collision as claimed in claim 1, in which the parametric uncertainties related to the articular velocity of the robot are uncertainties regarding the matrix of the centrifugal and Coriolis terms of the robot and/or regarding the viscous frictions.

14. The method of detecting collision as claimed in claim 1, in which a nonlinear function is the sign function or the exponential function or the absolute value function.

15. The method of detecting collision as claimed in claim 14, wherein the parametric uncertainties related to the sign of the articular velocity of the robot are uncertainties regarding the dry frictions.

16. A system for command of a robot comprising:

a control member for the manipulation of the robot;

an interface for the exchange of information regarding the state of the robot; and a processor for detecting collisions which is configured to execute a method for detecting a collision between a robot composed of a plurality of bodies linked together by at least one articulation and the environment of the robot, said method comprising:

moving the at least one articulation of the robot by manipulating, via a motor of the robot, a torque applied to the at least one articulation of the robot, receiving, from a measurement device of the control member, at least a measure of a variable characteristic of the state of the robot among a position, a velocity or an acceleration of the at least one articulation of the robot, executing, with the processor, a computer program stored on a non-transitory computer readable medium, the computer program stored on the non-transitory computer readable medium including instructions that when executed by the processor cause the processor to automatically perform the steps of:

generating, from a dynamic model of the robot, a signal representative of the collisions between the robot and the environment of the robot, said signal being called a residual r and comprising as many components as articulations of the robot, adaptive high-pass filtering of the residual r so as to render the residual r independent of parametric or non-parametric uncertainties related to low-frequency phenomena, determining recursively adaptive thresholds T composed of at least one first dynamic term $T_{A1}$ dependent on the parametric uncertainties between said model and the real behavior of the robot, said parametric uncertainties being related to a first variable $e_1$ characteristic of the state of said robot from among the following variables: the position, the velocity or the acceleration of the at least one articulation of the robot, or a linear or nonlinear function of one of these variables or of a combination of these variables, wherein determining recursively an adaptive threshold T of the adaptive thresholds T at a given instant is based upon a previously determined adaptive threshold of the adaptive thresholds T at an instant previous to the given instant, so that the adaptive threshold T is dependent on said parametric uncertainties between said model and the real behavior of the robot, comparing the filtered residual with the adaptive threshold T so as to deduce therefrom the existence or otherwise of the collision, deciding, as a result of the comparison of the filtered residual and the adaptive threshold T, if a collision between the robot and the environment of the robot occurs, providing the decision to the interface, and utilizing the decision provided to the interface, wherein the adaptive high-pass filtering is implemented via a recursive least squares algorithm and comprises:

estimating, in a recursive manner, the coefficients of the transfer function of the high-pass filter $G_0^{-1}$, and filtering the residual r with the estimated high-pass filter.

* * * * *